(12) United States Patent
Laroche et al.

(10) Patent No.: US 11,123,688 B2
(45) Date of Patent: Sep. 21, 2021

(54) COMPOSITION AND PROCESS FOR THE DEHYDRATION OF GASES

(71) Applicant: Dow Global Technologies LLC, Midland, MI (US)

(72) Inventors: Christophe R. Laroche, Lake Jackson, TX (US); Eric J. Klinker, Lake Jackson, TX (US); Sara B. Klamo, Houston, TX (US); Angela I. Padilla-Acevedo, Lake Jackson, TX (US); Ashwin R. Bharadwaj, Pearland, TX (US); Stephen W. King, League City, TX (US); Edward D. Daugs, Midland, MI (US); Brian A. Jazdzewski, Houston, TX (US)

(73) Assignee: Dow Global Technologies LLC, Midland, MI (US)

( * ) Notice: Subject to any disclaimer, the term of this patent is extended or adjusted under 35 U.S.C. 154(b) by 144 days.

(21) Appl. No.: 16/096,092

(22) PCT Filed: Apr. 20, 2017

(86) PCT No.: PCT/US2017/028563
§ 371 (c)(1),
(2) Date: Oct. 24, 2018

(87) PCT Pub. No.: WO2017/189318
PCT Pub. Date: Nov. 2, 2017

(65) Prior Publication Data
US 2019/0118136 A1    Apr. 25, 2019

Related U.S. Application Data

(60) Provisional application No. 62/329,415, filed on Apr. 29, 2016.

(51) Int. Cl.
*B01D 53/28* (2006.01)
*C10L 3/10* (2006.01)
(Continued)

(52) U.S. Cl.
CPC ......... *B01D 53/28* (2013.01); *B01D 53/1425* (2013.01); *B01D 53/263* (2013.01);
(Continued)

(58) Field of Classification Search
CPC .. B01D 53/1425; B01D 53/263; B01D 53/28; B01D 2252/504; B01D 2252/60;
(Continued)

(56) References Cited

U.S. PATENT DOCUMENTS 2,384,553 A    9/1945  Kiffer
2,988,171 A    6/1961  Arnold et al.
(Continued)

FOREIGN PATENT DOCUMENTS

| CN | 104277003 B | 8/2016 | |
|---|---|---|---|
| WO | 1998018542 A1 | 5/1998 | |
| WO | WO2015/123490 A1 * | 8/2015 | ............. B01D 53/14 |

OTHER PUBLICATIONS

Yang, Z. Z., He, L. N., Zhao, Y. N., & Yu, B. (2013). Highly efficient SO2 absorption and its subsequent utilization by weak base/polyethylene glycol binary system. Environmental science & technology, 47(3), 1598-1605. (Year: 2013).*
(Continued)

*Primary Examiner* — Jonathan Miller
*Assistant Examiner* — Gabriel E Gitman

(57) ABSTRACT

The present invention relates to a dehydration composition and method of use thereof for drying gas streams, in particular natural gas streams, wherein the dehydration composition comprises (i) a glycol, (ii) an imidazole compound, and optionally (iii) one or more of an alkali metal
(Continued)

carboxylate, an additional glycol different than (i), an alkanolamine, a phosphate acid, a salt of a phosphate acid, a borate acid, a salt of a borate acid, a sweetening agent, a low temperature viscosity improver, a corrosion inhibitor, an antifoaming agent, or mixtures thereof.

3 Claims, 3 Drawing Sheets

(51) Int. Cl.
    *B01D 53/26*     (2006.01)
    *B01D 53/14*     (2006.01)

(52) U.S. Cl.
    CPC ...... *C10L 3/106* (2013.01); *B01D 2252/2023* (2013.01); *B01D 2252/2026* (2013.01); *B01D 2252/20473* (2013.01); *B01D 2252/20489* (2013.01); *B01D 2252/504* (2013.01); *B01D 2252/60* (2013.01); *C10L 2290/08* (2013.01); *C10L 2290/542* (2013.01); *C10L 2290/545* (2013.01)

(58) Field of Classification Search
    CPC .... B01D 2252/2023; B01D 2252/2026; B01D 2252/20473; B01D 2252/20489; B01D 53/507; B01D 53/1481; C10L 3/106; C10L 2290/08; C10L 2290/545; C10L 2290/542
    See application file for complete search history.

(56) References Cited

U.S. PATENT DOCUMENTS

| | | | |
|---|---|---|---|
| 3,349,544 A | | 10/1967 | Arnold et al. |
| 3,745,746 A | * | 7/1973 | Psyras ............ C07C 9/04 95/194 |
| 4,758,367 A | | 7/1988 | George |
| 4,959,086 A | | 9/1990 | Van Baar et al. |
| 6,063,972 A | * | 5/2000 | Duncum ............ C09K 8/52 585/15 |
| 6,955,705 B1 | * | 10/2005 | Cheney ............ B01D 53/263 418/201.1 |
| 8,506,914 B2 | | 8/2013 | Bara |
| 2010/0326276 A1 | * | 12/2010 | Blair ............ B01D 53/1462 95/205 |
| 2011/0256043 A1 | * | 10/2011 | Blair ............ B01D 53/1456 423/228 |
| 2012/0248372 A1 | * | 10/2012 | Bara ............ B01D 53/62 252/184 |

OTHER PUBLICATIONS

Pan, Y. et. al., "Large-scale synthesis of ZIF-67 and highly efficient carbon capture using a ZIF-67/glycol-2-methylimidazole slurry," Chemical Engineering Science, 2015, p. 504-514, v. 137.

Huang, L. et. al., "A hybrid absorption-adsorption method to efficiently capture carbon," Nature Communications, 2014, p. 5147, v. 5.

Nakatani, K., et. al., "Bis(imidazolylalkyl) ethers, their manufacture, and their use as catalysts in manufacture of polyurethane foams," Chemical Abstracts, 1991, v. 114.

Kohl, A.L. et. al., "Glycol Dehydration Processes—Glycol Selection," Gas Purification, 1997, p. 953-955, ed. 5th, Gulf Publishing Company, Houston, TX.

Kohl, A.L. et. al., "Monoethanolamine-Glycol Mixtures," Gas Purification, 1997, p. 50, ed. 5th, Gulf Publishing Company, Houston, TX.

Database WPI, Week 201521, Thomson Scientific, London, GB, AN 2015-169079, Univ Hebei Sci and Technology, 2015.

* cited by examiner

COMPOSITION AND PROCESS FOR THE DEHYDRATION OF GASES

FIELD OF THE INVENTION

The present invention relates to a composition and method of use thereof for drying gas streams, in particular natural gas streams, wherein the composition comprises a glycol, preferably triethylene glycol and an imidazole compound. Said triethylene glycol compositions are particularly suitable for dewatering gas streams comprising water.

BACKGROUND OF THE INVENTION

Gases, such as natural gas, generally contain varying amounts of water vapor. It is desirable that no water vapor be admitted to a natural gas pipeline. The presence of the water vapor is undesirable as the water vapor can result in corrosion of pipes and cause corrosion of, and stoppages in, valves and fittings in gas pipe transmission systems. Further, quantities of water or moisture that are relatively small may freeze and block the pipeline such that flow is completely halted or at least greatly restricted.

A common method for removing moisture from gas streams, such as natural gas, is to use a gas dehydration unit using a glycol as a solvent. In such a unit, the wet gas is contacted with a lean drying agent solution, such as a glycol, in an absorbent step to remove the water. The glycol commonly used is triethylene glycol (TEG) and to a lesser extent other glycols such as diethylene glycol (DEG) or ethylene glycol (EG). The rich glycol (i.e., glycol containing the water) is then passed to a reconcentration or regeneration process typically comprising a reboiler wherein the absorbed water is driven off and removed, thereby enabling reuse of the regenerated glycol.

A troublesome problem arises herein, however, in that, simple heating of the drying agent may not remove a sufficient amount of water. The efficiency of the gas drying operation is a function of the residual water in the regenerated dehydrating agent. Raising the temperature during regeneration tends to drive off more moisture, but the use of excess heat also promotes degradation of the dehydrating agent by formation of pyrolysis products. These pyrolysis products in turn further reduce the effectiveness of the dehydrating agent.

Furthermore, such pyrolysis products may produce acids which may create corrosion problems in the gas dehydration units. To combat corrosion, drying agent compositions may comprise corrosion inhibitors, such as an alkanolamine. Commonly employed alkanolamines are, for example, monoethanolamine, diethanolamine, triethanolamine, etc. However, alkanolamines may be volatile and/or thermally unstable at dehydration reboiler temperatures.

Therefore, there still exists a need for a drying agent solution with improved thermal stability having corrosion inhibition properties.

SUMMARY OF THE INVENTION

The present invention is such a dehydration composition and process for removing water from a gas stream comprising water using a gas dehydration composition comprising, essentially consisting of, or consisting of: i) a glycol, preferably monoethylene glycol, diethylene glycol, tetraethylene glycol, monopropylene glycol, dipropylene glycol, tripropylene glycol, tetrapropylene glycol, or glycerol, more preferably triethylene glycol; ii) an imidazole compound having the formula:

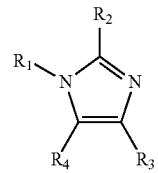

wherein $R_1$ is H or a branched or a linear alkyl group having from 1 to 20 carbons, a hydroxy alkyl group having from 1 to 20 carbons, or an amino alkyl group having from 1 to 20 carbons or a polyoxyalkyl group, $R_2$, $R_3$, and $R_4$ are independently H or a branched or a linear alkyl group having from 1 to 20 carbons, a hydroxyalkyl group having from 1 to 20 carbons, or an aminoalkyl group having from 1 to 20 carbons, preferably $R_2$, $R_3$, and $R_4$ are independently selected from H, or a branched or linear alkyl group having from 2 to 4 carbons, a hydroxyalkyl group having from 2 to 4 carbons, or an aminoalkyl group having from 2 to 4 carbons and (iii) optionally an additional additive selected from an alkali metal carboxylate, one or more additional glycol different than (i), an alkanolamine, a phosphate acid, a salt of a phosphate acid, a borate acid, a salt of a borate acid, a sweetening agent, a low temperature viscosity improver, a corrosion inhibitor, an antifoaming agent, or mixtures thereof.

In one embodiment of the present invention, in the imidazole compound described herein above, $R_1$ is a polyoxyalkyl group having the formula:

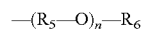

$$-(R_5-O)_n-R_6$$

wherein $R_5$ is an alkylene group having from 1 to 6 carbons, $R_6$ is H or a linear or branched alkyl group having from 1 to 20 carbons, and n is equal to 1 to 10.

In a preferred embodiment of the present invention, in the imidazole compound described herein above, $R_2$, $R_3$, and $R_4$ are H, $R_5$ is ethylene, n is 4, and $R_6$ is methyl.

In a preferred embodiment of the present invention, in the imidazole compound described herein above, $R_1$, $R_3$, and $R_4$ are H, and $R_2$ is methyl.

One embodiment of the present invention is a process for removing water from a gas stream comprising water comprising the step contacting the gas stream with a the gas dehydration composition disclosed herein above.

In another embodiment the process of the present invention comprises the step of (a) contacting said gas in a continuous counter current contact zone with said dehydrating composition, preferably further comprising the steps (b) regenerating said water-rich dehydrating composition at a temperature of 120° C. to 225° C. to form a lean dehydration composition and (c) using all or part of the regenerated lean dehydration composition, repeat step (a).

DETAILED DESCRIPTION OF THE INVENTION

Figure 1:
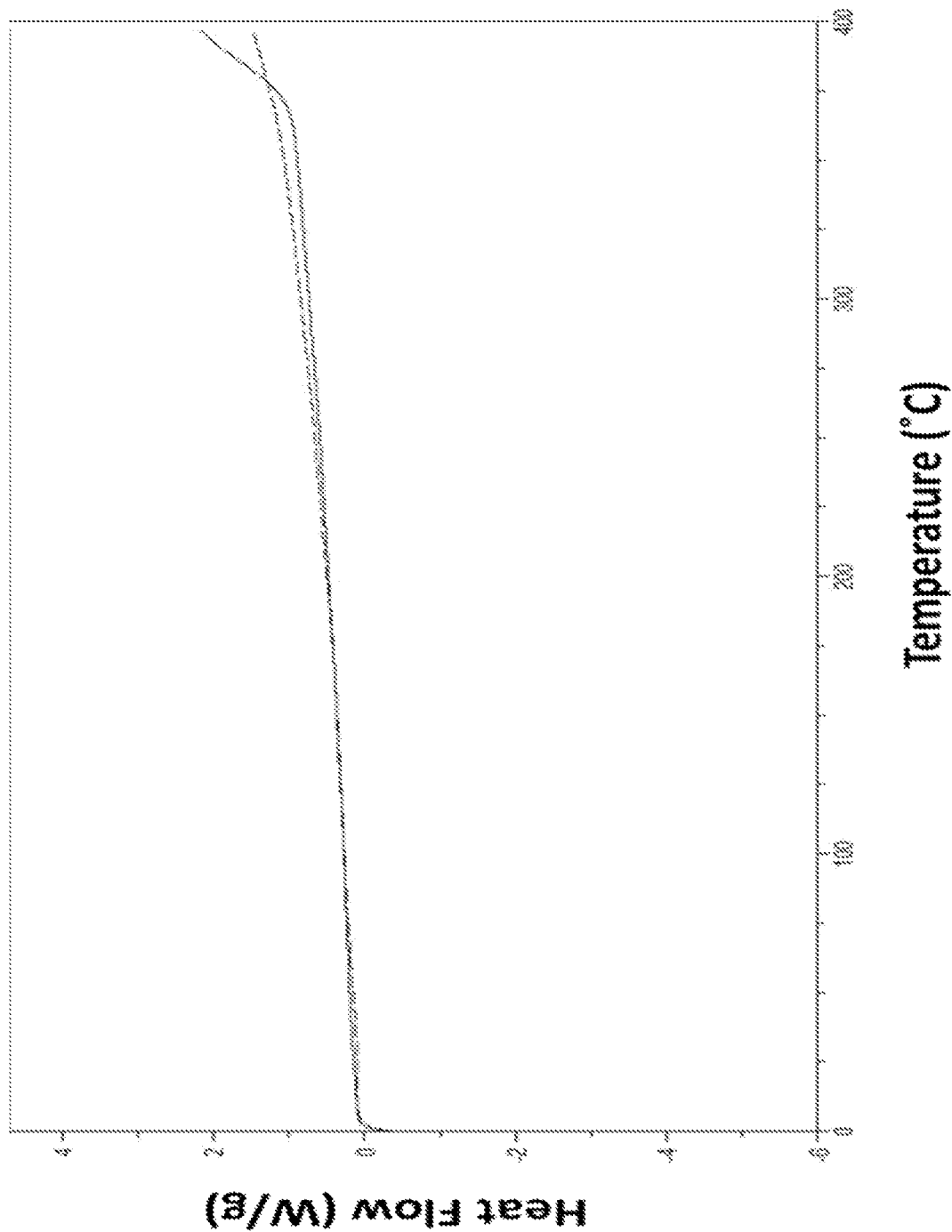
FIG. 1 is a DSC of 1-(2, 5, 8, 11-tetraoxatridecan-13-yl)-imidazole in PPG.

The dehydration compositions of the present invention may be used to remove water from any gas stream comprising water, they are particularly suited for removing water from any gas comprising water, and are particularly suited for use with raw and/or treated natural gas. Raw natural gas comes from three types of wells: oil wells, gas wells, and condensate wells. Natural gas that comes from oil wells is typically termed "associated gas". This gas can exist separate from oil in the formation (free gas), or dissolved in the crude oil (dissolved gas). Natural gas from gas and condensate wells, in which there is little or no crude oil, is termed "non-associated gas". Gas wells typically produce raw natural gas by itself, while condensate wells produce free natural gas along with a semi-liquid hydrocarbon condensate. Whatever the source of the natural gas, once separated from crude oil (if present) it commonly exists as a mixture of methane and other hydrocarbons, water, salts, and other impurities, such as acid gases. The term "natural gas" as used herein below includes any natural gas source comprising water including raw or treated natural gas. Treated natural gas is raw natural gas that has been treated one or more times to remove one or more impurities.

The process of dehydrating a gaseous fluid using a glycol is well known in the art, such as is described by the processes in U.S. Pat. No. 2,988,171 and Kohl et al., "Gas Purification" 4$^{th}$ Edition, 1985, Gulf Publishing Company. However, it will be apparent to those skilled in the art that such a counter-current system could be used for drying other gases as well. These known processes can be used with the dehydrating compositions of the present invention. Preferably, the gas is contacted with the dehydrating composition in a continuous counter-current flow process. When the gaseous fluid is natural gas, the process generally passes the gas into the bottom of an absorber unit, equipped with baffles, trays, random packing, structured packing, or combination thereof, where the gas is contacted counter-currently in the contact zone with a lean dehydrating composition to remove the water. The dry gas exits the top of the absorber unit and the rich dehydrating composition is removed from the bottom of the absorber unit and pumped to a series of heat exchanges or to a flash tank or larger units. After the flash tank, or directly from the smaller absorber units, the rich dehydrating composition passes through a series of heat exchangers and filters before going to a still and regenerator, where water is stripped from the dehydrating composition.

The temperature and pressure of the gas to be dehydrated can have an effect on the process of this invention. For example, for natural gas containing primarily methane, the temperature of the gas to be dehydrated will usually be within the range of about 20° C. to 45° C., having been reduced from higher temperatures when discharged from its underground source. Pressure during dehydration is usually increased to between about 500 to 1,000 psi. At this temperature, the gas will contain about 0.5 to 5 percent by weight of water.

Water-rich dehydration composition of the present invention is pumped through a closed-loop (of which the absorber is part) including various filters, strippers, heat exchangers, etc., and a reboiler wherein the water-rich dehydration composition of the present invention is conventionally heated and maintained at a temperature of from 150° C. to about 225° C., preferably at a temperature from 170° C. to 220° C., such that the water is driven off. All or part of the resulting lean regenerated dehydration composition of the present invention may then be returned through the remaining portion of the loop back to the absorber, again to flow in countercurrent exchange with natural gas comprising water.

In one embodiment, a dehydrating composition used in the present invention comprises (i) one or more glycol, (ii) an imidazole compound, and (iii) optionally an additional additive selected from an alkali metal carboxylate, one or more additional glycol different than (i), an alkanolamine, a phosphate acid, a salt of a phosphate acid, a borate acid, a salt of a borate acid, a sweetening agent, a low temperature viscosity improver, a corrosion inhibitor, an antifoaming agent, or mixtures thereof.

In another embodiment, a dehydrating composition used in the present invention consists essentially of comprises (i) one or more glycol, (ii) an imidazole compound, and (iii) optionally an additional additive selected from an alkali metal carboxylate, one or more additional glycol different than (i), an alkanolamine, a phosphate acid, a salt of a phosphate acid, a borate acid, a salt of a borate acid, a sweetening agent, a low temperature viscosity improver, a corrosion inhibitor, an antifoaming agent, or mixtures thereof.

In yet another embodiment, a dehydrating composition used in the present invention consists of (i) one or more glycol, (ii) an imidazole compound, and (iii) optionally an additional additive selected from an alkali metal carboxylate, one or more additional glycol different than (i), an alkanolamine, a phosphate acid, a salt of a phosphate acid, a borate acid, a salt of a borate acid, a sweetening agent, a low temperature viscosity improver, a corrosion inhibitor, an antifoaming agent, or mixtures thereof.

The glycols usually employed as component (i) are mono-, di-, tri-, and tetraethylene glycol and mono-, di-, tri-, and tetrapropylene glycol. Penta- and hexaethylene glycol and penta- and hexapropylene glycol may be employed, however; the higher glycols have higher viscosities making them less suitable for the present application. In addition, higher glycols may co-absorb higher concentration of hydrocarbon which could be detrimental during the dehydration of a stream of methane, ethane, or propane. Preferably the glycol is selected from triethylene glycol, ethylene glycol (monoethylene glycol), diethylene glycol, tripropylene glycol, or mixtures thereof. The more preferred glycol is triethylene glycol.

The glycol is present in an amount from 60 to 99.9 weight percent based on the total weight of the dehydration composition. Preferably, the glycol is present in the dehydration composition in an amount equal to or greater than 60 weight percent, more preferably equal to or greater than 70 weight percent, more preferably equal to or greater than 80 weight percent, and even more preferably equal to or greater than 85 weight percent based on the total weight of the dehydration composition. Preferably, the glycol is present in the dehydration composition in an amount equal to or less than 99.9 weight percent, more preferably equal to or less than 99.5 weight percent, more preferably equal to or less than 99 weight percent, more preferably equal to or less than 95 weight percent, and even more preferably equal to or less than 90 weight percent based on the total weight of the dehydration composition.

The imidazole compound (ii) useful in the dehydration compositions of the present invention has the formula:

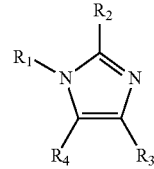

wherein $R_1$ is H or a branched or a linear alkyl group having from 1 to 20 carbons, a hydroxy alkyl group having from 1 to 20 carbons, or an amino alkyl group having from 1 to 20 carbons or a polyoxyalky group,
and
$R_2$, $R_3$, and $R_4$ are independently H or a branched or a linear alkyl group having from 1 to 20 carbons, a hydroxyalkyl group having from 1 to 20 carbons, or an aminoalkyl group having from 1 to 20 carbons.

In one embodiment of the present invention, $R_1$ is a polyoxyalkyl group having the formula:

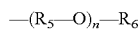

wherein $R_5$ is an alkylene group having from 1 to 6 carbons, preferably 1 to 4 carbons, more preferably 1 to 3 carbons, and most preferably 2 carbons,
$R_6$ is H or a linear or branched alkyl group having from 1 to 20 carbons, preferably 1 to 6 carbons, more preferably 1 to 3 carbons, most preferably 1 carbon,
and
n is equal to 1 to 20, more preferably 1 to 10, more preferably 1 to 6, and more preferably 1 to 4, and more preferably 1 to 2.

In a preferred embodiment of the present invention $R_1$, $R_3$, and $R_4$ are H, and $R_2$ is methyl.

In one embodiment of the present invention the imidazole compound is 1-(2, 5, 8, 11-tetraoxatridecan-13-yl)-imidazole having the formula:

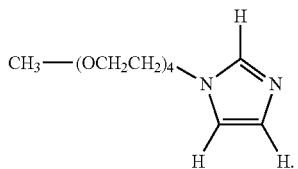

Preferably, the imidazole compound is present in the dehydration composition in an amount of equal to or greater than 0.05 weight percent, more preferably equal to or greater than 0.1 weight percent, more preferably equal to or greater than 0.2 weight percent, and even more preferably equal to or greater than 0.4 weight percent based on the total weight of the dehydration composition. Preferably, the imidazole compound is present in the dehydration composition in an amount equal to or less than 10 weight percent, more preferably equal to or less than 5 weight percent, more preferably equal to or less than 4 weight percent, and even more preferably equal to or less than 3 weight percent based on the total weight of the dehydration composition.

The dehydration composition of this invention can contain a minor amount of one or more additional additive (iii) including, but not limited to: a glycol different from glycol (i); an alkali metal carboxylate; a phosphate acid or a salt of a phosphate acid, such as phosphoric acid, potassium phosphate, dipotassium phosphate, disodium phosphate, or trisodium phosphate, see U.S. Pat. No. 2,384,553 which is incorporated by reference herein in its entirety; a sweetening agent, such as a sulfolane, ethers of polyethylene glycol; a low temperature viscosity improver, for example propylene carbonate, dimethylformamide or N-substituted morpholine compounds; an antifoaming agent, for example silicone based defoamers and EO/PO based defoamers such as polysiloxane and polypropylene glycol copolymers, or a corrosion inhibitor. If present, these ingredients are used independently in an amount of from 0.01 weight percent to 30, weight percent based on the total weight of the dehydration composition.

Suitable additional glycols are, for example, monoethylene glycol, diethylene glycol, triethylene glycol, monopropylene glycol, tetraethylene glycol, pentaethylene glycol, or glycerol, an alkanolamine, such as monoethanolamine (MEA), diethanolamine (DEA), methyldiethylanolamine (MDEA), or triethanolamine (TEA), see U.S. Pat. No. 3,349,544 which is incorporated by reference herein in its entirety. If present, the one or more additional glycol is preferably used in an amount of from 0.01 weight percent to 25, weight percent based on the total weight of the dehydration composition.

Suitable alkali metal carboxylates are sodium acetate, potassium acetate, sodium formate, potassium formate, sodium bicarbonate, potassium bicarbonate, sodium glycolate, potassium glycolate, sodium lactate, or potassium lactate as well as their hydrates, with sodium acetate preferred. If present, the alkali metal carboxylates is preferably used in an amount of from 0.01 weight percent to 10, weight percent based on the total weight of the dehydration composition.

In general, if present, the one or more additional additives are used independently in an amount of from 0.01 weight percent to 30, weight percent based on the total weight of the dehydration composition. If present, the additional additive (s) (iii) is independently present in the dehydration composition in an amount equal to or greater than 0.1 weight percent, more preferably equal to or greater than 1 weight percent, more preferably equal to or greater than 2 weight percent, and even more preferably equal to or greater than 5 weight percent based on the total weight of the dehydration composition. If present, the additional additive(s) (iii) is independently present in the dehydration composition in an amount equal to or less than 30 weight percent, more preferably equal to or less than 25 weight percent, more preferably equal to or less than 20 weight percent, and even more preferably equal to or less than 15 weight percent based on the total weight of the dehydration composition.

The pH of the dehydration compositions of this invention, whether a concentrate or diluted fluid, must be controlled for purposes of corrosion protection. The compositions should have a pH of equal to or greater than 7 to equal to or less than 11. Preferably the dehydration composition of the present invention has a pH of equal to or greater than 7, more preferably equal to or greater than 7.5, more preferably equal to or greater than 8. Preferably the dehydration composition of the present invention has a pH of equal to or less than 11, more preferably equal to or less than 10, more preferably equal to or less than 9.

Control of the pH is provided by appropriate adjustment of the imidazole compound within the ranges specified herein, the imidazole compound acting as a buffer to maintain the pH within the desired range.

In one embodiment of the present invention the dehydration composition comprising an imidazole compound disclosed herein above is used to remove water from a gas stream by contacting the gas stream with the imidazole containing dehydration composition. Preferably the method comprises the step of (a) contacting said gas stream in a continuous counter current contact zone with said imidazole containing dehydrating composition to form a water-rich dehydrating composition.

Another embodiment of the method of the present invention comprises the step of (a) contacting said gas stream in a continuous counter current contact zone with said dehydrating composition to form a water-rich dehydrating composition, (b) regenerating said water-rich dehydrating composition at a temperature of 120° C. to 225° C. to form a lean dehydration composition and (c) using all or part of the regenerated lean dehydration composition, repeat step (a).

EXAMPLES

One or more of the following is used in Examples 1 to 4:
"TEG" is triethylene glycol available from Alfa Aesar at 99% purity;
"PPG" is polypropylene glycol available from Sigma-Aldrich at average Mn of 425:
"IMIDAZOLE-1" is 2-methylimidazole available as 99% from Sigma-Aldrich; and
"IMIDAZOLE-2" is 1-(2, 5, 8,11-tetraoxatridecan-13-yl)-imidazole has been produced as follows: A three necked round bottom flask equipped with a reflux condenser is charged with 1H-imidazole (31.365 g, 460 mmol) (>99% purity from Sigma-Aldrich) and 13-bromo-2, 5, 8, 11-tetraoxatridecane (25 g, 92 mmol) (95-98% purity from TCI America). The reaction mixture is heated to 100° C. for 5 hours then cooled down to room temperature. About 200 mL of brine is added and the reaction mixture is extracted using chloroform (200 ml). The organic phase is washed 5 times with a saturated solution of sodium chloride (100 mL) in order to remove the excess of imidazole. Then, the organic phase is dried with sodium sulfate and the solvent is evaporated under vacuum to give 23.3 g (98% yield) of 95% pure 1-(2, 5, 8, 11-tetraoxatridecan-13-yl)-1H-imidazole.

Figure 2:
FIG. 2 is a DSC of 1-(2, 5, 8, 11-tetraoxatridecan-13-yl)-imidazole.
Figure 3:
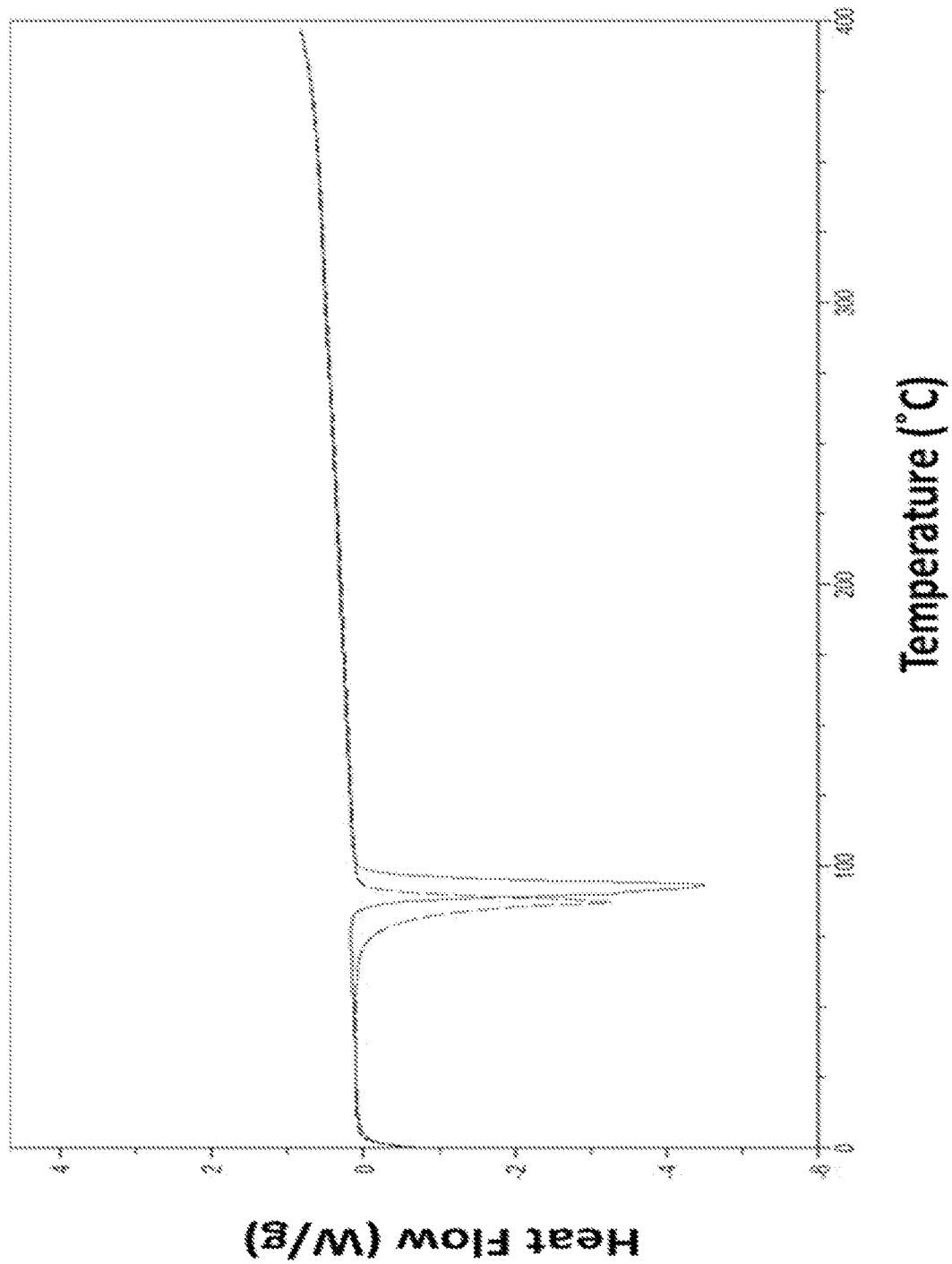
FIG. 3 is a DSC of 2-methylimidazole.

Duplicate DSC curves for 5 wt % 1-(2, 5, 8, 11-tetraoxatridecan-13-yl)-imidazole in PPG, pure 1-(2, 5, 8, 11-tetraoxatridecan-13-yl)-imidazole (no solvent) and pure 2-methylimidazole (no solvent) are shown in FIG. 1, FIG. 2 and FIG. 3, respectively.

Thermal stability is determined by adding 50 g of the glycol mixture to be tested to a 75 mL stainless steel sample bomb. The solutions are sparged with nitrogen for 10 minutes. After sparging, the sample bomb is sealed and placed into an oven at 200° C. for seven days. The extent of degradation is assessed by performing gas chromatography and reserve alkalinity tests before and after aging. Gas chromatography analyses are performed using 7890A GC system equipped with DB wax column and Helium as gas carrier. Samples are diluted to comprise 1 wt % to 20 wt % methanol. Reserve alkalinity tests are performed as follow: the solutions to analyze are titrated using 0.5N HCl and an automatic titrator Mettler Toledo T90. The titration is performed using hydrochloric acid (HCl) purchased from Fisher Scientific at 0.5N concentration on a 10 g sample size. Reserve alkalinity is defined as the amount HCl in millimeter necessary to reach the equivalent volume. The results are provided in Table 1.

Corrosivity is determined by adding a pre-weighed C1010 coupon and the glycol mixture of Example 2 and Comparative Example B to a 1.8 liter 316 stainless steel Parr reactor, stirring at 200° C. for 14 days, then determining the corrosivity by coupon weight loss which is reported in Table 2.

TABLE 1

| Component | Example 1 | Comparative Example A |
|---|---|---|
| TEG, g | 97 | 97 |
| IMIDAZOLE-1, g | 1.5 | 0 |

TABLE 1-continued

| | Example 1 | Comparative Example A |
|---|---|---|
| DEA, g | 0 | 1.5 |
| Water, g | 1.5 | 1.5 |
| Thermal Stability | | |
| Before Aging | 2.46 | 1.73 |
| After Aging | 2.18 | 1.19 |
| % change | 12 | 37 |

TABLE 2

| | Example 2 | Comparative Example B |
|---|---|---|
| Component | | |
| TEG, wt % | 93 | 93 |
| IMIDAZOLE-1, wt % | 2 | |
| Na$_2$B$_4$O$_7$, wt % | | 2 |
| Water, wt % | 5 | 5 |
| Corrosiveness | | |
| Corrosion Rate, mm/yr | 0.51 | 0.55 |

What is claimed is:
1. A process for removing water from a natural gas stream comprising:
in a continuous counter current contact zone, contacting the natural gas stream with a gas dehydration composition comprising:
(i) a glycol in an amount equal to or greater than 85 weight percent and equal to or less than 99.9 weight percent, based on a total weight of the gas dehydration composition, the glycol being monoethylene glycol, diethylene glycol, triethylene glycol, tetraethylene glycol, monopropylene glycol, dipropylene glycol, tripropylene glycol, tetrapropylene glycol, or glycerol,
(ii) an imidazole compound in an amount equal to or greater than 0.1 weight percent and equal to or less than 10 weight percent, based on the total weight of the gas dehydration composition, the imidazole compound having the formula:

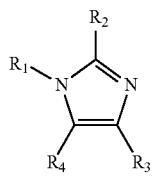

wherein $R_1$ is H, a branched or a linear alkyl group having from 1 to 20 carbons, a hydroxy alkyl group having from 1 to 20 carbons, an amino alkyl group having from 1 to 20 carbons or a polyoxyalkyl group, and $R_2$, $R_3$, and $R_4$ are independently H, a branched or a linear alkyl group having from 2 to 4 carbons, a hydroxyalkyl group having from 2 to 4 carbons, or an aminoalkyl group having from 2 to 4 carbons, and
(iii) optionally an additional additive selected from an alkali metal carboxylate, one or more additional glycols different than (i), an alkanolamine, a phosphate acid, a salt of a phosphate acid, a borate acid, a salt of a borate acid, a sweetening agent, a low temperature viscosity improver, a corrosion inhibitor, an antifoaming agent, or a mixture thereof.

2. The process of claim 1, wherein
contacting the natural gas stream with a gas dehydration composition includes contacting said natural gas stream in the continuous counter current contact zone with said gas dehydration composition to form a water-rich dehydration composition.

3. The process of claim 2, further comprising the steps of:
regenerating said water-rich dehydration composition at a temperature of 120° C. to 225° C. to form a lean dehydration composition, and
using all or part of the regenerated lean dehydration composition to form at least a portion of the gas dehydration composition.

* * * * *